United States Patent [19]

Schüch

[11] Patent Number: 5,540,478

[45] Date of Patent: Jul. 30, 1996

[54] ROOF STRUCTURE OF A MOTOR VEHICLE

[75] Inventor: Siegmund Schüch, München, Germany

[73] Assignee: Webasto Karosseriesysteme GmbH, Germany

[21] Appl. No.: 234,401

[22] Filed: Apr. 26, 1994

[30]     Foreign Application Priority Data

Apr. 26, 1993 [DE] Germany .......................... 43 13 555.2

[51] Int. Cl.⁶ ................................................. B60J 7/00
[52] U.S. Cl. ........................... 296/210; 296/197; 296/216;
224/331
[58] Field of Search .................................. 296/216, 210,
296/196, 197; 224/331, 309, 329

[56]                  References Cited

U.S. PATENT DOCUMENTS

| 4,293,161 | 10/1981 | Lutz | 296/213 |
|---|---|---|---|
| 4,410,211 | 10/1983 | Kloppe et al. | 224/329 X |
| 4,834,448 | 5/1989 | Sakamoto et al. | 224/309 |
| 4,842,326 | 6/1989 | DiVito | 296/196 |
| 4,887,859 | 12/1989 | Aper | 296/196 X |

FOREIGN PATENT DOCUMENTS

| 0278435 | 8/1988 | European Pat. Off. | 224/309 |
|---|---|---|---|
| 423815 | 4/1991 | European Pat. Off. | 224/331 |
| 2950643 | 6/1981 | Germany | 296/210 |
| 3429880 | 2/1986 | Germany | 296/197 |
| 3644492 | 7/1987 | Germany | 296/216 |
| 3614740 | 11/1987 | Germany | 224/309 |
| 3809196 | 9/1989 | Germany | 224/326 |
| 3904000 | 5/1990 | Germany | 296/216 |
| 3837972 | 5/1990 | Germany | 296/210 |
| 4027452 | 3/1992 | Germany | 224/331 |
| 44530 | 3/1982 | Japan | 296/216 |
| 39319 | 2/1987 | Japan | 296/216 |
| 2147860 | 5/1985 | United Kingdom | 224/309 |
| 2184404 | 6/1987 | United Kingdom | 296/216 |
| 2220392 | 1/1990 | United Kingdom | 296/216 |

*Primary Examiner*—Dennis H. Pedder
*Attorney, Agent, or Firm*—Sixbey, Friedman, Leedom & Ferguson, P.C.; David S. Safran

[57]                ABSTRACT

A roof structure of a motor vehicle is described in which on the side lateral roof members of a shell from the vehicle manufacturer dimensionally defined master mounting points are located, on which a modular roof insert which is completely premounted by the supplier can be installed over uniformly spaced attachment points on roof strips which run lengthwise. Regardless of the superstructure of the roof insert which is extremely variable based on the use of different roof parts, by combining the roof parts on the roof strips provided with the attachment points at the supplier's, assembly at the vehicle manufacturer always takes place at the same master mounting points. In this way high flexibility of the roof superstructure is achieved with significant simplification in the logistical supply chain and in assembly at the vehicle manufacture.

20 Claims, 13 Drawing Sheets

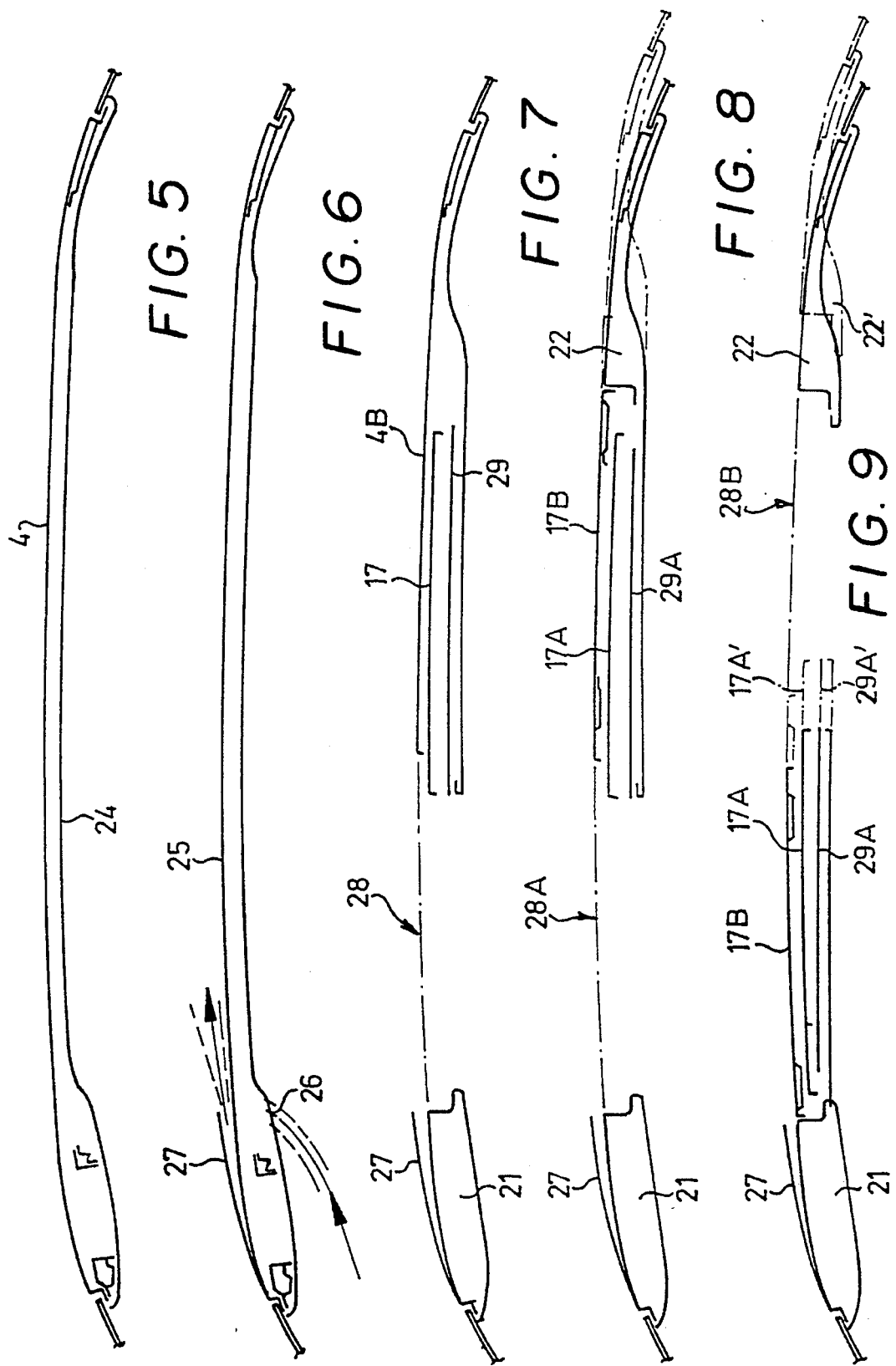

5,540,478

ROOF STRUCTURE OF A MOTOR VEHICLE

BACKGROUND OF THE INVENTION

1. Field of the Invention

The invention relates to a roof structure of a motor vehicle which, has lateral roof members which run in the longitudinal direction of the vehicle, on which there are essentially horizontal flanges pointed to the inside, and which contains, in addition at least one roof part for closing a roof opening which lies between the lateral roof members.

2. Description of Related Art

A roof structure of this type is known from U.K. Patent Application 2184404A. The roof part which can be inserted into the fixed roof frame structure is supplied to the vehicle manufacturer as a completely installed and enamelled modular roof insert from the supplier and contains a single continuous roof plate which is attached to the lateral roof members, for example, by screwing, cementing or the like. At the vehicle manufacturer, due to the delivery of a premounted and tested roof module, this known design results in advantages with respect to industrial scale installation; however, a special complete roof module must be produced with special tools if any modifications of the roof module are required.

SUMMARY OF THE INVENTION

The primary object of this invention is to devise a roof structure of a motor vehicle which combines the advantages of quick installation at the vehicle manufacturer with high variability with respect to the superstructure of the roof module.

This problem is solved by the preferred embodiments of the invention which call for the vehicle manufacturer to place at least two master mounting points which are dimensionally specific as regards the structure of the vehicle frame shell, longitudinally in succession on each lateral roof member. At the vehicle supplier, different modular roof are arranged in succession according to the wishes of the final customer and are connected with two side roof strips, and if necessary, with a front and a rear frame part, into a premounted structural unit which, based on its attachment points on the roof strips located at the same interval as the master mounting points on the frame shell, can always be attached to the same points of the shell, independently of the use of individual roof modules. By means of the roof structure according to the invention a large number of roof versions can be effected by joining different roof parts by one-time coordination between the vehicle manufacturer and supplier and by using congruent jigs for generating the master mounting points on the frame shell and the attachment points on the roof strips, the finished roof insert always being mounted on the frame shell at the same points. With respect to using assembly robots, this is exceptionally advantageous. Since alignment of the finished roof module with respect to the shell always takes place at the same points, the vehicles can also be lengthened for special structural shapes using simple means, for which on the roof side, only the addition of one or several roof parts to an lengthened roof strip is necessary.

One advantageous embodiment of the master attachment points on the lateral roof members calls for forming them as screw sleeves which are accessible from the inside, which are located on the lateral roof members, and which run transversely to the longitudinal axis of the vehicle; the attachment points on the roof strips can be attached by collar screws to the screw sleeves from the inside of the roof. These screw sleeves are especially advantageous for equalizing production tolerances when they consist of flexible material, preferably a polyamide. In this case, it is advantageous if the screw sleeves of flexible material are surrounded by a support bush of rigid material, for example, metal.

It is also advantageous if the lateral roof members for mounting the screw sleeves and if necessary the surrounding support bushes, at least in the area of the master mounting points, are reinforced by at least one reinforcing plate located parallel to them, for which the screw sleeves are then held and mounted from an inwardly facing wall of the roof runner and/or the reinforcing sheets. This measure greatly increases the carrying capacity of the master mounting points.

For sealing between the frame shell and the roof module, it is advantageous if there is a continuous sealing strip of flexible material between the flanges on the roof runners and the roof strips. In one especially advantageous embodiment, this sealing strip is formed by a layer of adhesive which is located between the underside of the roof strips and the top side of the flange, and which produces, in addition to the sealing function, also an additional fixed connection between the roof strips and the shell. To remove the roof module, in the case of repair or modification, it is advantageous if a pull-out plastic filament is integrated in the vicinity of this adhesive layer in order to tear through it.

Multiple use of the attachment points (collar screws) arises by the fact that the latter are engaged by tools of transport, stockpiling and mounting devices during transport and mounting of the roof insert. Since the master mounting points are selected in a more sensible manner anyway, such that they enable suspension of the entire roof module with minimum deformation, it is useful to surround these attachment points with gripper-like plier tools for the aforementioned purposes.

Another multiple use for the master mounting points or attachment points arises by the fact that, after mounting the modular roof insert, additional parts, such as a roof railing or roof superstructures which increase the roof height can be attached to the master mounting points or attachment points. Access to the attachment points for the aforementioned purposes is advantageously gained by the fact that the roof strips are formed, at least partially, as a hollow section, for which it has, in the area of the attachment points, openings towards the top, through which the gripper tools can fit. In one advantageous development, in the upper part of the roof strips, there are cover strips which have cover parts which can be opened in the area of the openings. By removing, folding up or pushing away the cover parts, this yields easy access to the attachment points together with a favorable optical impression of the entire completely mounted roof when the cover parts are closed. In addition, one embodiment is advantageous in which the cover strip and the modular roof parts are attached to the roof strip using the same attachment means. This also results in a multiple use for these attachment means, for example, screws.

One especially advantageous version in the assembly of roof modules calls for at least of one of the roof parts to contain a roof plate which can be slid in the longitudinal direction of the vehicle to expose a sliding roof opening, in which a roof superstructure which increases the roof height is attached to the attachment points above the sliding roof opening. By means of this arrangement, simple retrofitting of a vehicle is possible such that the opened sliding roof part which, for example, is located above a trunk in the rear part of the vehicle, exposes, by pushing forward, a heightened cargo space which is closed in a weather-tight manner from above by the raised roof superstructure. This raised roof superstructure can, for example, be advantageously used to transport bicycles. Another version can consist, for example, in that an opened movable sliding roof plate is spanned by a glass dome made of bulletproof glass so that a special vehicle of this type is suitable for protecting individuals driving through a large crowd of people from potential attack. Another possible use may consist in that, in the vicinity of the edge of a sliding roof opening which is exposed by a sliding roof plate, a tripod mount for a camera is emplaced by attachment to the attachment points, by means of which the vehicle becomes suitable for recording films with the carried camera. Finally, large-area extra roof devices which span the entire roof surface, such as folding tents or upturned boats, can be attached to the attachment points. All the aforementioned additional devices and parts are attached without additional cost with the same gripping tools to the uniformly spaced attachment points. Thus, there is almost universal applicability of the roof according to the invention for special purposes.

When using sliding roof plates, in one or several roof parts it is advantageous if guide rails for the sliding roof plate, and if necessary mounts for attaching a fixed vehicle inner roof lining, are molded onto the roof strips. This advantage yields both time and cost savings when the roof module is assembled at the supplier and also for adding a ceiling lining to the roof at the vehicle manufacturer.

To adapt to currently conventional curved roof contours, it is advantageous if the roof strips and/or the cover strips are bent and/or divided in the longitudinal direction. In a roof contour of this type which is curved in the rear part of the vehicle, to reduce the width, it is advantageous if a roof plate that is narrower on its rear edge is guided to slide on guide rails which likewise narrow to the rear by means of sliding elements which enable equalization of the width.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 5–9 show possible versions of inserted roofs;

FIG. 19A shows a partial longitudinal section through a guide rail taken along line 19A—19A of FIG. 19.

DETAILED DESCRIPTION OF THE PREFERRED EMBODIMENTS

Figure 1:
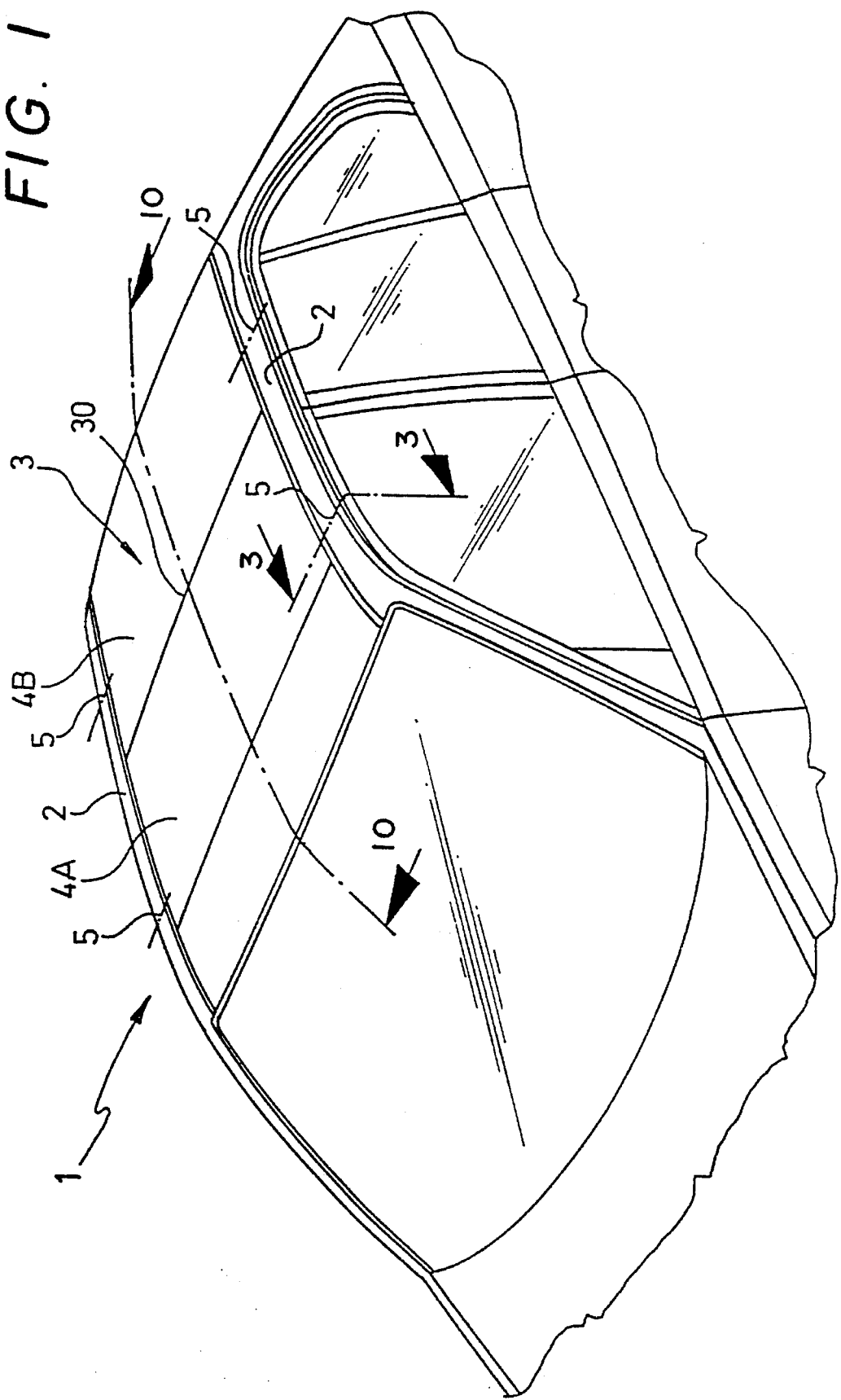
FIG. 1 shows a schematic perspective view of a roof structure of a motor vehicle.

As shown in FIG. 1, a vehicle 1 has two lateral roof members 2, between which a roof opening exists when the vehicle is in a frame shell state. This roof opening is closed by a roof insert 3 which is painted and completely premounted by a supplier for installation on a conveyor belt of the vehicle manufacturer. Roof insert 3 is modular, i.e., it can be assembled from variously configured roof parts 4A, 4B. This assembly proceeds, as described below, at the supplier. Modular roof insert 3 is always attached at the vehicle manufacturer at the same master mounting points 5 which are located as dimensionally defined reference points for attaching modular roof insert 3 to lateral roof members 2.

Figure 2:
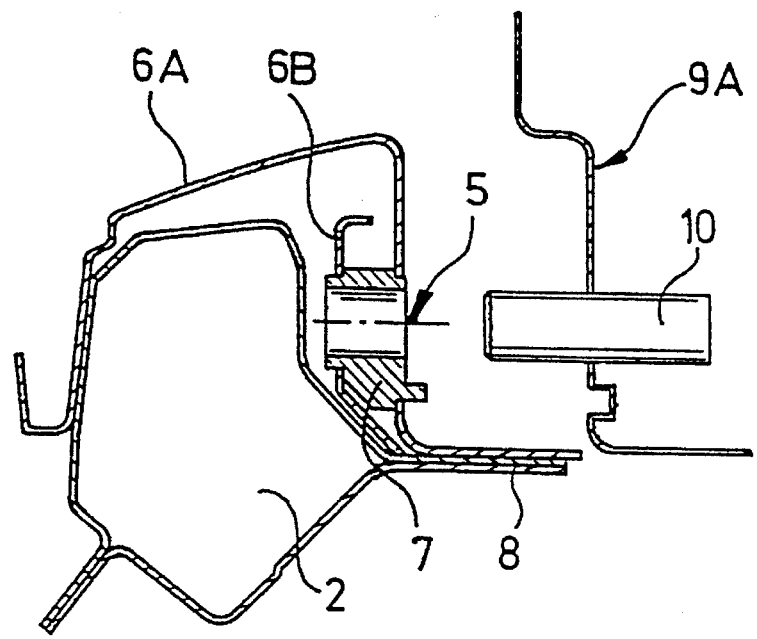
FIG. 2 shows a cross section through a lateral roof member in the area of a master mounting point when the shell is produced.
Figure 3:
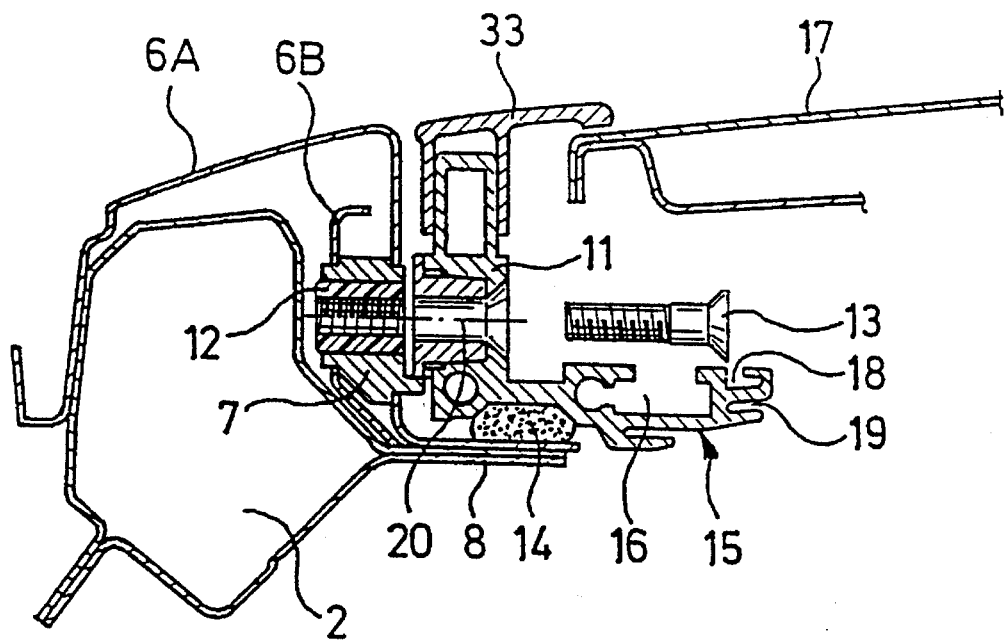
FIG. 3 shows a cross section through the same location according to FIG. 2 when the roof insert is installed.

FIG. 2 shows one such master mounting point 5 when the vehicle is in its frame shell state. Roof member 2 is reinforced in the area of each master mounting point 5 by two reinforcing sheets 6A, 6B which are joined, together with the sheets which form the lateral roof members 2 to flange 8 which runs essentially horizontally and which is pointed laterally inwardly toward the center line of the vehicle. After a shell jig 9A is applied, by means of schematically shown tool 10, master mounting point 5 is established in the area of lateral roof members 2 reinforced by reinforcing sheets 6A, 6B. Here, an embodiment which has proven itself useful is one in which in a metal support bush 7 is securely positioned in a hole which penetrates reinforcing plates 6A, 6B. A screw sleeve 12 is inserted into this support bush 7, as shown in FIG. 3, and is made of a flexible material such as a polyamide.

Figure 4:
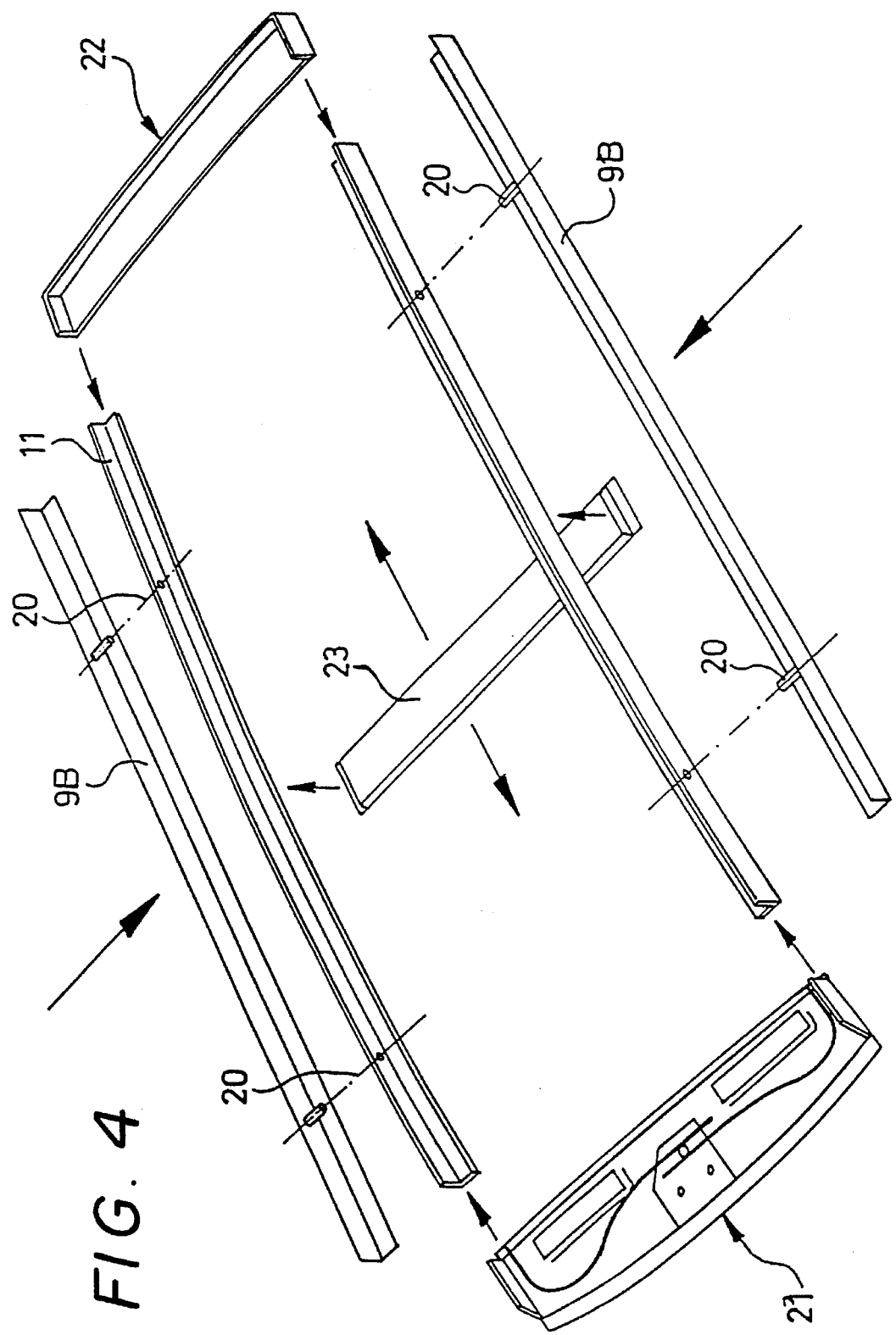
FIG. 4 shows a schematic of the assembly of a roof insert at the supplier.

At the vehicle supplier, a jig 9B, which is identical to jig 9A is used in the assembly of a roof insert (FIG. 4). Roof insert 3 is formed by joining a frame front part 21 and a rear frame part 22 to two longitudinal roof strips 11 to produce a peripherally closed frame. Optionally, an additional transverse runner 23 can be provided to connect longitudinal roof strips 11. Roof strips 11 have attachment points 20 which are formed as holes and which are produced by applying the assembling jig 9B. Since the spacing of attachment points 20 relative to one another and to the forward edge of the longitudinal roof strips 11 are produced using identical jigs 9B, at the supplier, and 9A, at the vehicle manufacturer, their position corresponds exactly to the position of master mounting points 5 on the frame shell, regardless of which modules (roof pans) are attached to roof strips 11, roof insert 3 in the assembly line can always be attached to the same master mounting points 5 of the vehicle body. This is an especially great advantage when using assembly robots. No limits are imposed on the diversity of roof parts 4, 4A, 4B, 24 and 25 which can be attached to roof strips 11 as described below. Thus, using the modular roof insert, great variability in the superstructure of the roof can be linked to standardization of assembly, so that, at the vehicle manufacturer, no additional burden at all arises in stock keeping or assembly. When roof insert 3 is assembled according to FIG. 4, the most varied roof parts can be attached to roof strips 11, as FIGS. 5–9 show.

FIG. 5 shows a simple continuous roof plate 24 and FIG. 6 shows a front fan roof 25 with a vent flap 27 which can be moved outwards and upwards in the forward area and vent slots 26 located in this area on the inside lining. In FIG. 7, a sliding roof is mounted on roof strips 11; the sliding roof consists of fixed roof part 4B, a sliding roof cover 17, sliding liner 29 which can slide underneath it, and also a vent flap 27 located in the forward area. FIGS. 8 and 9 show an double cover sliding roof attached to roof strips 11, of which, in FIG. 8, forward siding roof cover 17A is pushed under rear sliding roof cover 17B and thus exposes roof opening 28A. In FIG. 9, on the other hand, rear sliding roof cover 17B is pushed over the front sliding roof cover 17A and thus exposes roof opening 28B in the rear of the vehicle. In FIG. 9, reference numbers 17A' or 29A' and 22' indicate that when the vehicle is lengthened (as shown by phantom line) by a simple lengthening of one or both of sliding roof covers 17A' and the pertinent sliding roof lining 29A' and by displacement of the rear frame part 22 to the rear, roof insert 3 can be easily adapted to a lengthened vehicle. It should be recognized that the details of the blower and sliding roofs of FIGS. 6–9, by themselves, form no part of the present invention and may be of the same conventional construction as would be used without implementation of the modular design mounting construction of the present invention. Likewise, other known roof constructions beyond these examples may be used.

Figure 10:
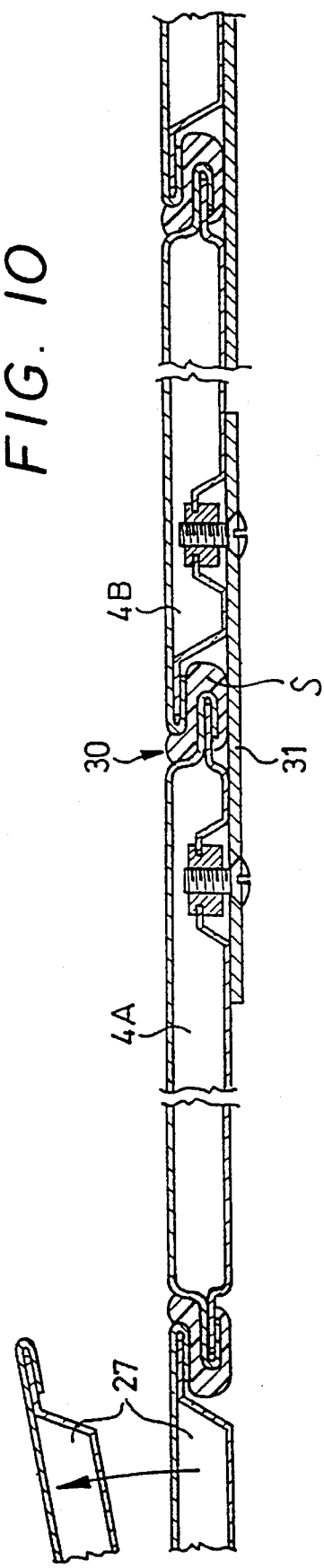
FIGS. 10 and 11 show versions of the joining of roof parts into a roof insert in the area of the joints which run transversely to the direction of travel.
Figure 11:
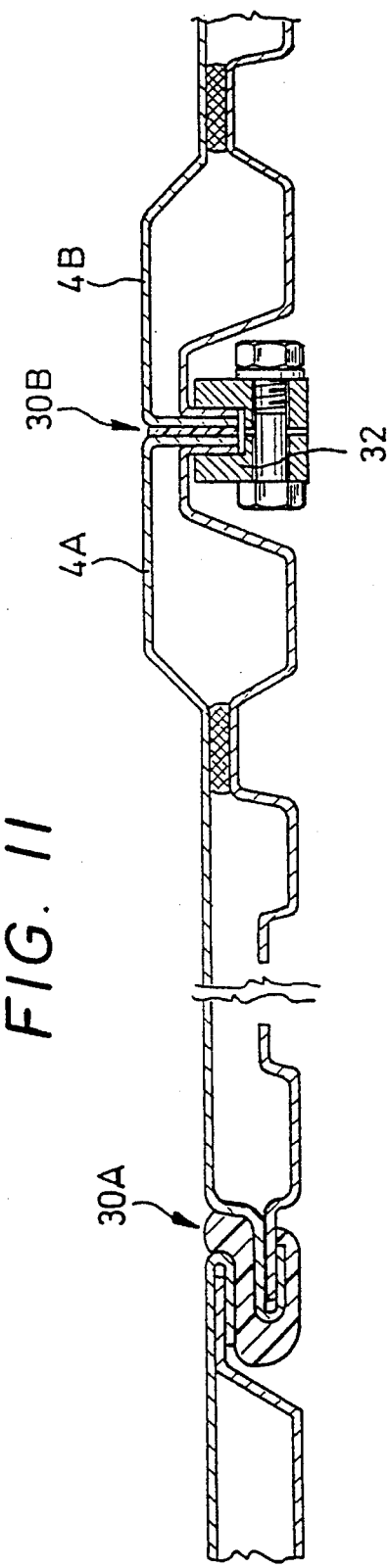

FIGS. 10 and 11 show the joining of fixed roof parts in the area of joints 30, which run transversely to the longitudinal direction of the roof and of the vehicle. In FIG. 10, front roof part 4A is joined with rear roof part 4B, overlapping one another, at joint location 30 with insertion of a seal S. The connection is made by horizontal flange plate 31 and two screws which fit into roof parts 4A, 4B and which vertically penetrate the flange plate.

In the version shown in FIG. 11, two roof parts 4A', 4B' are interconnected in the area of joint site 30B by a bolted clamp 32 which press together downwardly bent ends of the two roof parts with an interposed seal.

Figure 12:
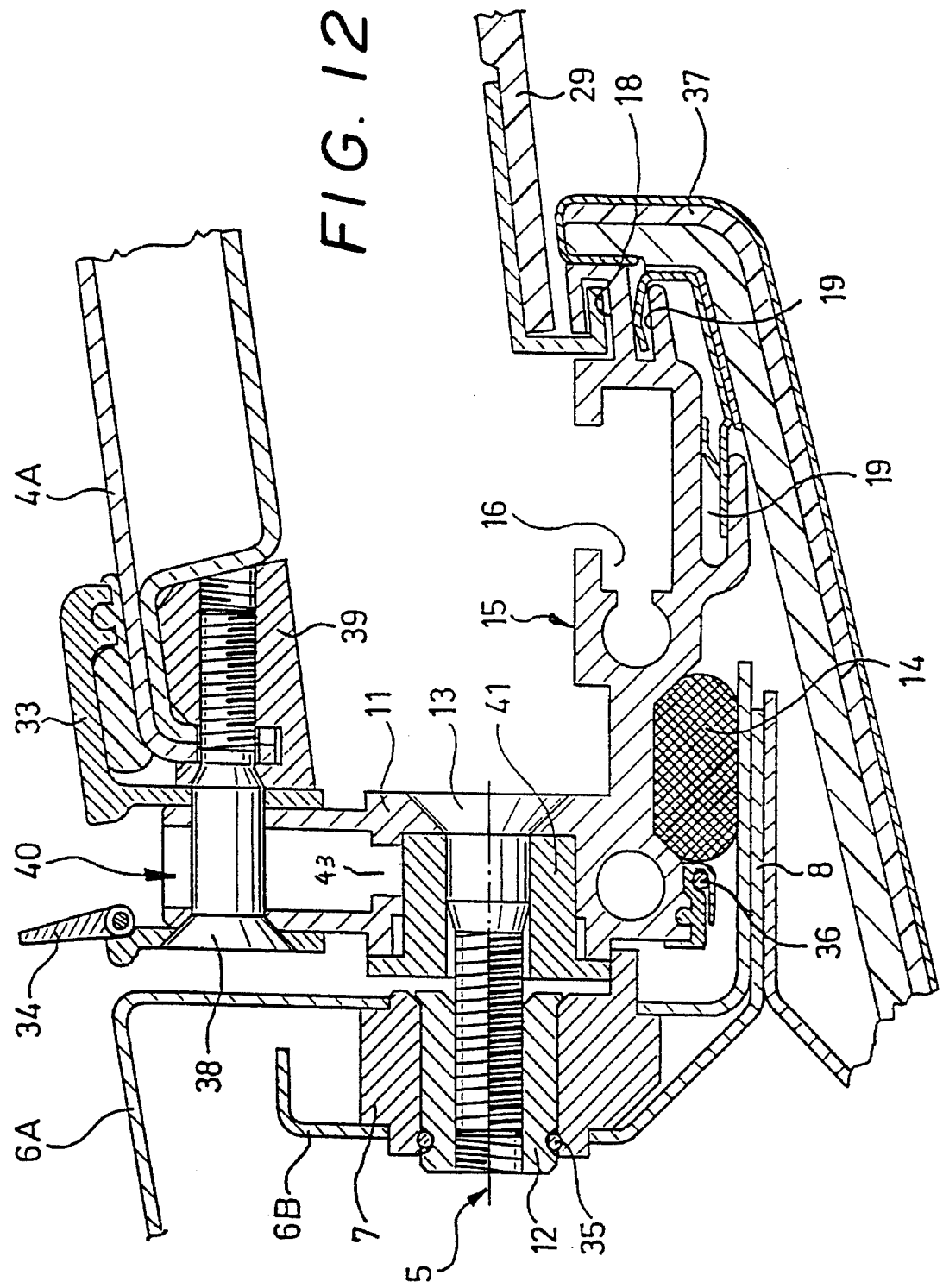
FIG. 12 shows an enlarged cross section through a lateral roof member and the side edge of a roof insert in the area of the master mounting or attachment point, corresponding to a view along section line 12—12 in FIG. 13.
Figure 13:
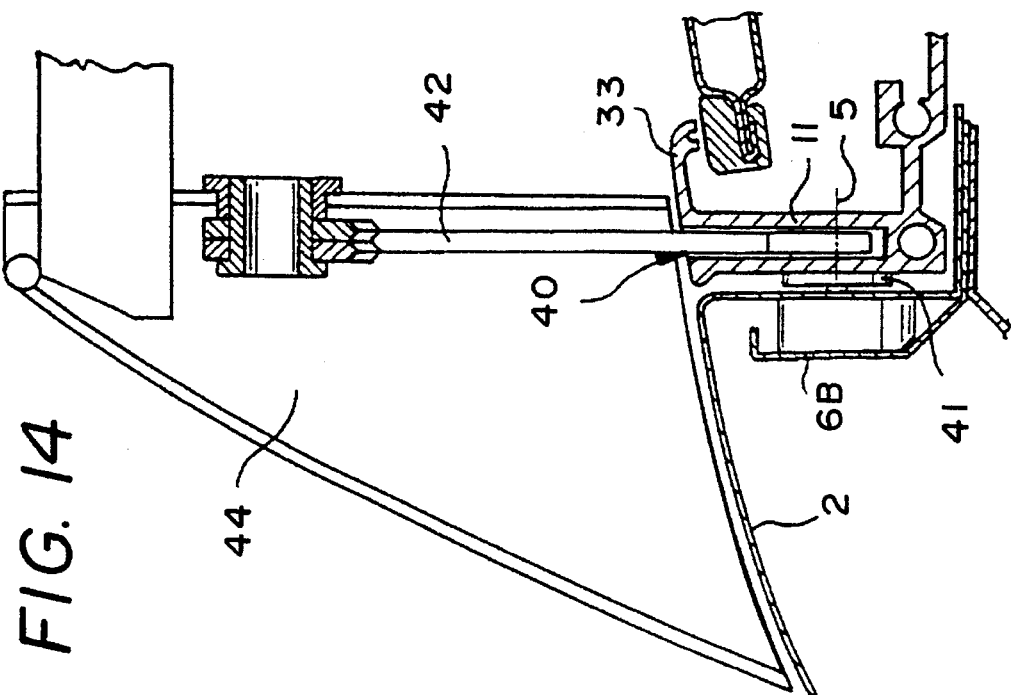
FIG. 13 shows a partial longitudinal section through a roof strip with a gripping tool which engages the attachment point.

FIG. 12 shows, in enlarged form, one joint of a roof insert provided with a roof part which can be opened. In this case, roof strip 11 has a vertical part formed as a hollow section with an opening 40 which opens upwardly. Opening 40 can run the whole length of roof strip 11 or it can be confined to the area of the attachment points 20; however, the bottom wall of the opening 40 is provided with cutouts 43 (formed, for example, by milling) only in the area of the attachment points 20. A horizontal part, which is pointed laterally inward and which contains a guide rail 15 for a movable roof part, is a molded-on portion of roof strip 11. Guides 16 for unillustrated slide elements of the roof part which can be opened, inside liner guides 18 for a sliding inside liner 29, and mounts 19 for attaching a fixed inside liner 37 are molded-on parts of the guide rail 15. Modular roof part 4A, which contains the roof part which can be opened, is connected by screws 38 in the upper part of roof strip 11 jointly with cover strip 33 which is mounted from above on roof strip 11; screws 38 are screwed into threaded piece 39 which conforms positively to the underside of roof part 4A. At the level of attachment point 20 (FIG. 3), an elongated molding 41, having a projecting band facing the lateral roof member 2, is mounted in a recess at the laterally outer side of roof strip 11. Molding 41 has, on the one hand, a hole for a collar screw 13, and on the other hand, two wing-shaped projections 41A spaced at opposite sides of the hole (FIG. 13). Screw sleeve 12 is fixed in the support bush 7 by means of snap ring 35 in an annular groove. When the roof insert is installed, a layer of adhesive 14 is first applied peripherally to flange 8; as can be seen, roof strip 11 has a trapezoidal recess provided on the underside which is then placed on the layer of adhesive.

On the bottom of roof strip 11, a pull-out filament 36 is positioned by means of a holder. By means of the filament 36, as necessary, for example, in case of repair or if roof insert 3 is to be replaced by a differently configured roof insert 3, layer of adhesive 14 can be torn through.

Roof strip 11 and master mounting point 5 are made congruent, a projecting part of roof strip 11 lying on a projecting part of support bush 7. Finally, a collar screw 13 is screwed into screw sleeve 12 from the inside, the screw sleeve 12 flaring like a dowel when the sleeve is drawn together with roof strip 11 so as to lie securely against the wall of support bush 7. After the layer of adhesive 14 sets, roof insert 3 is held together with flange 8 essentially by the adhesive layer. The role of collar screws 13 for attachment of roof insert 3 is of subordinate importance from here on; however, collar screws 13 in conjunction with molding 41 continue to play a supporting role for attachment of additional parts to roof insert 3, as is described in the following.

Cover strip 33 in the area of each opening 40 of roof strip 11 has a cover part 34. They can, as shown, either be arranged to pivot on cover strip 33, or in other embodiments (not shown) they can be designed to move or to be entirely removed in the longitudinal direction of cover strip 33.

Figure 14:
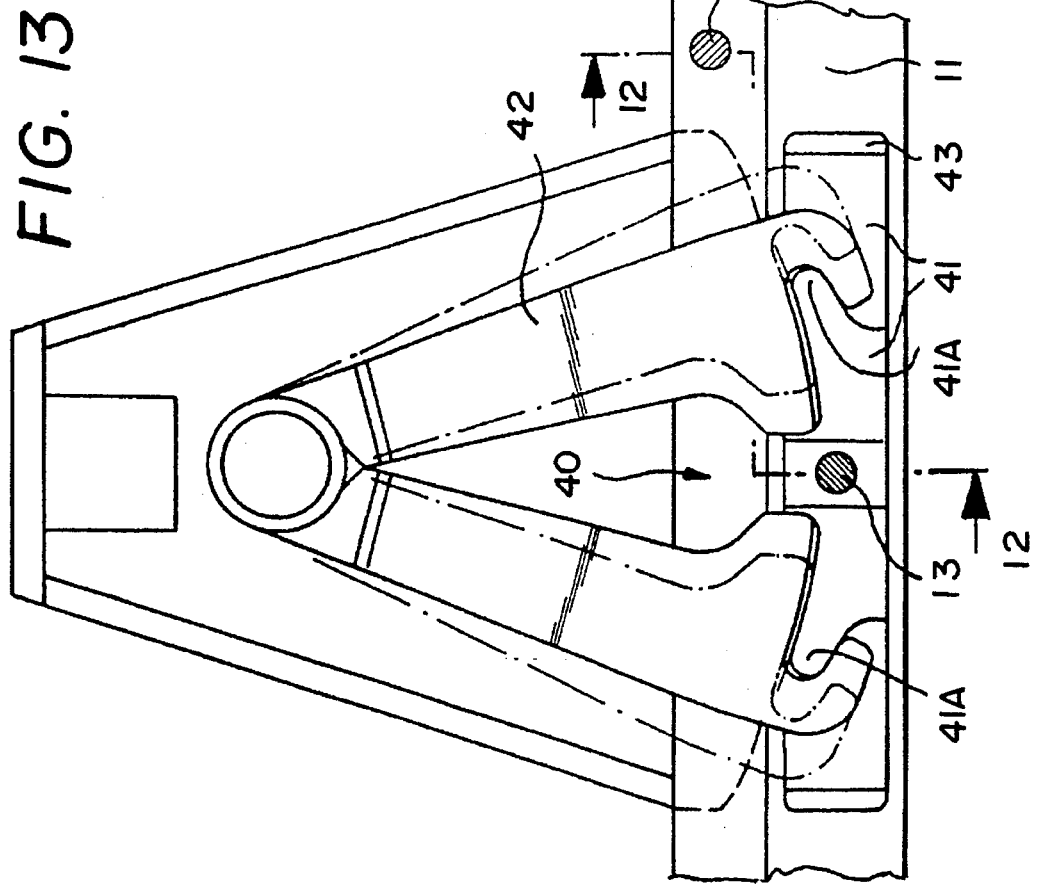
FIG. 14 shows a cross section in the area of the master or attachment point with a roof railing attached there.

If cover 34, as shown in FIG. 12, is opened, the uncovered opening 40 in roof strip 11, in conjunction with the cutouts 43 provided in the lower part strip 11 enables vertical insertion of pliers-like clamping tool 42 into the internal cavity of roof strip 11. After clamping tool 42 is closed, molding 41 is securely clamped by the two plier parts of clamping tool 42 in the area of the wing-shaped projections 41A of molding 41. Pictured clamping tool 42 can be provided as a similar part both in transport, in storage or in installation of a roof insert and as a tool on the corresponding devices, and also after installation of the roof insert, as shown in FIG. 14, for attaching additional roof parts (there, the roof railing 44). During transport, blocks located, for example, on the plier parts of the clamping tool, one can be used as spacers for horizontal palleting of several roof inserts lying one on top of another.

Figure 15:
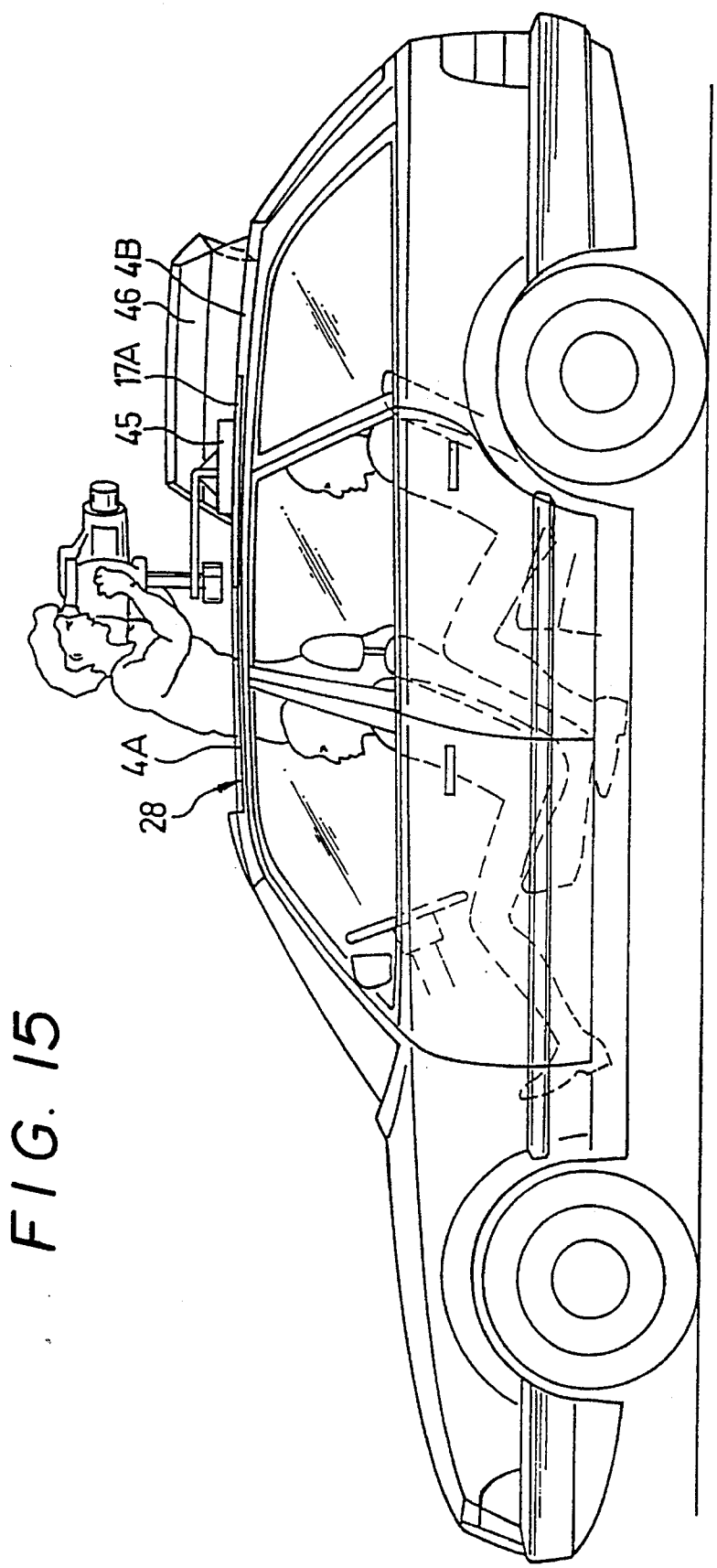
FIG. 15 shows a first possible application of a roof insert provided with an roof plate which can be opened and additional roof superstructures.
Figure 16:
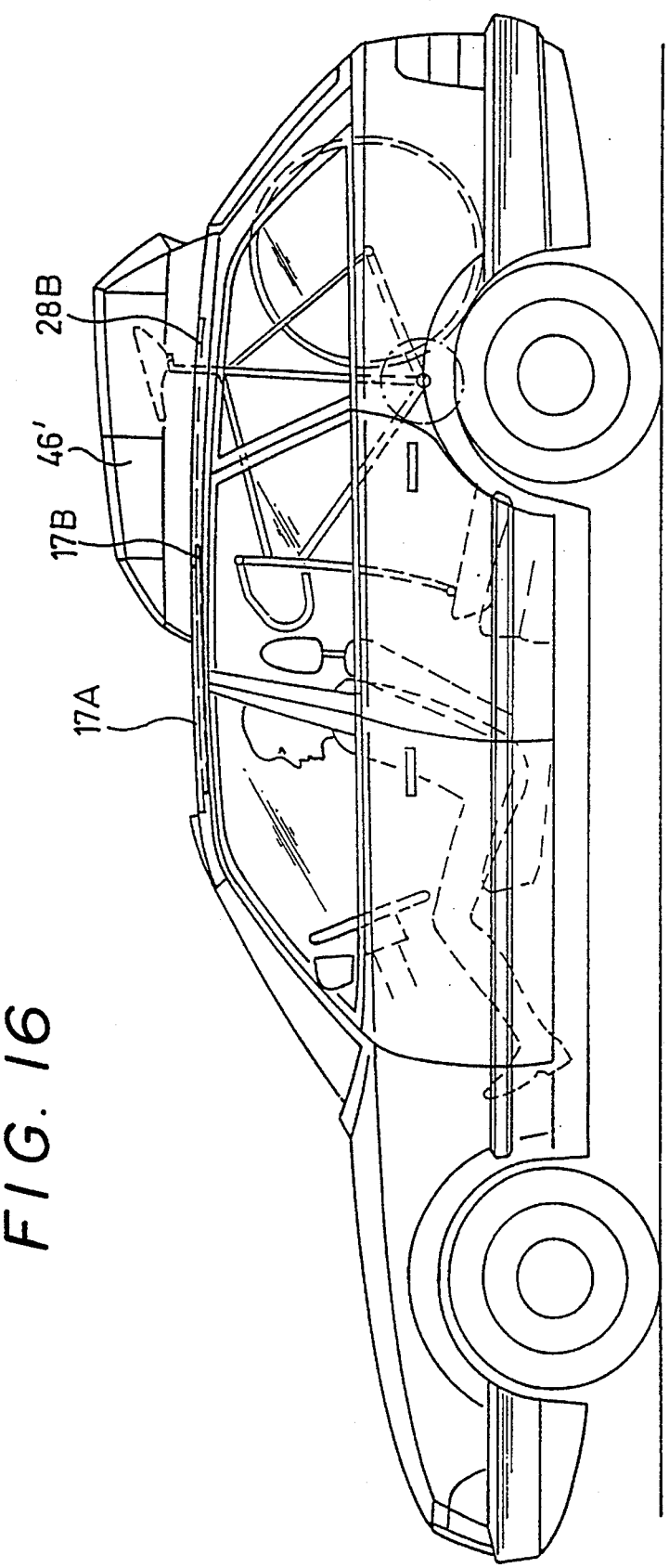
FIG. 16 shows a second possible application of a roof insert provided with a sliding roof plate and an additional roof superstructure.

FIG. 15 and 16 show other possibilities of variable use of roof insert 3. In both cases, the roof insert 3 is provided with at least one roof part 4A, 4B in which sliding roof cover 17A, 17B is located. In FIG. 15, sliding roof cover 17A is pushed backward to expose roof opening 21 over the front seat of the vehicle. In the area of the master mounting points 5, above the C columns on attachment point 20, by means of an attachment similar to clamping tool 42, a tripod holder 45 is located on which a camera for recording films from a moving vehicle can be mounted. In the area of its rear part, the vehicle has an additional roof superstructure 46 which, in this case, forms a unit with tripod holder 45 and is used to hold additional baggage necessary in conjunction with shooting film.

In FIG. 16, roof insert 3 has a double cover sliding roof with rear cover 17B, shown moved forward, and which has additional roof superstructure 46' which raises the roof height and extends over the roof opening 28B which has become exposed by movement of cover 17B. Roof superstructure 46' is, in turn, attached as an extra module in the area of attachment points 20 to roof strips 11. In the station wagon shown, bicycles can be transported standing vertically due to the increased roof elevation.

Although not shown, other embodiments of additional superstructures can also be attached to attachment points 20. For example, a complete boat hull can be attached upside down, i.e., with the keel upwards, to the roof strips using grip plier-like tools. Another version consists in that a transparent dome of bullet-proof material arches over a large roof opening which is exposed for example by a sliding roof plate. A vehicle of this type can be sensibly used for special trips by highly endangered individuals through large crowds of people. This vehicle can moreover also be used for other purposes without any adverse effects due to the ease of removal of the additional roof superstructure.

Figure 17A:
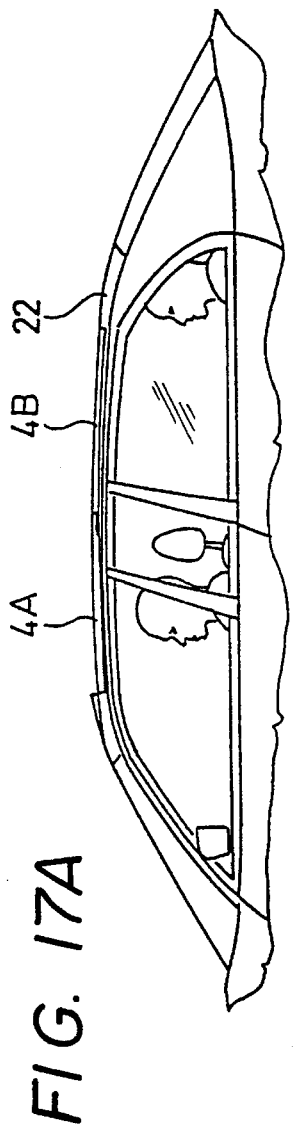
FIG. 17a and 17b show a schematic of lengthening a roof insert with a required lengthening of the vehicle.
Figure 17B:
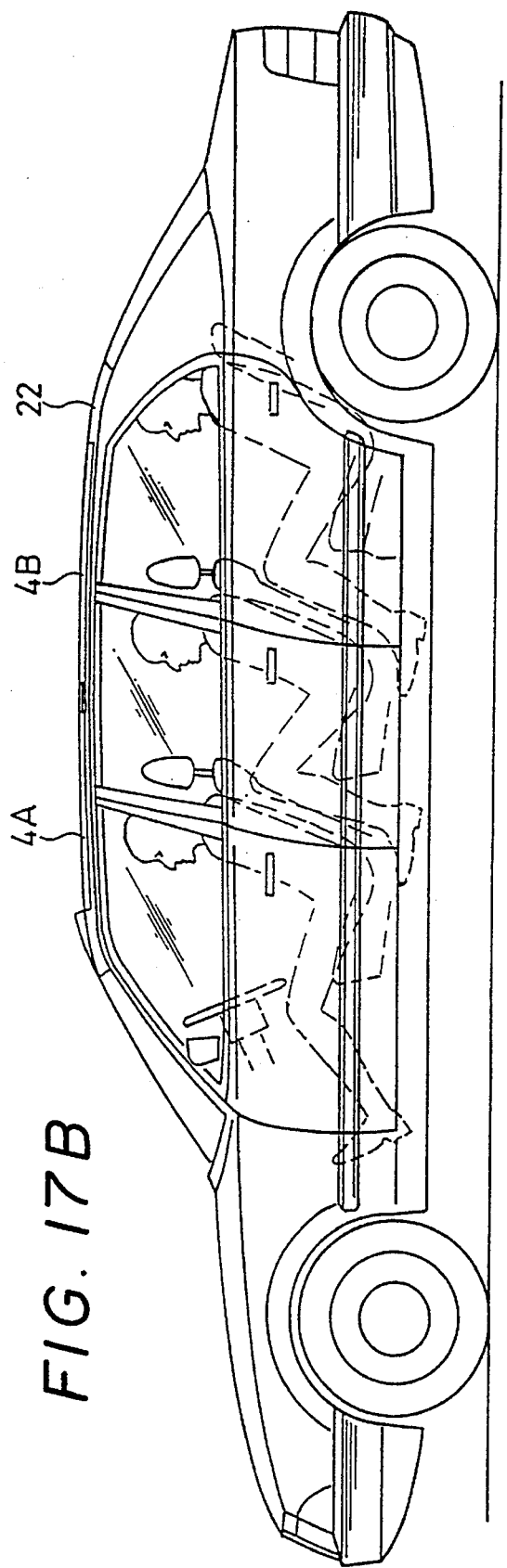

Finally, FIGS. 17a and 17b show that, when a vehicle must be lengthened, for example to install another row of seats, e.g., when creating a so-called "stretch" limousine, it is easy to adapt roof insert 3 to the length of modules 4A' or 4B' shown in FIG. 17B by simply lengthening one or both of roof modules 4A, 4B while maintaining the same master mounting point and attachment point locations and construction.

Figure 18:
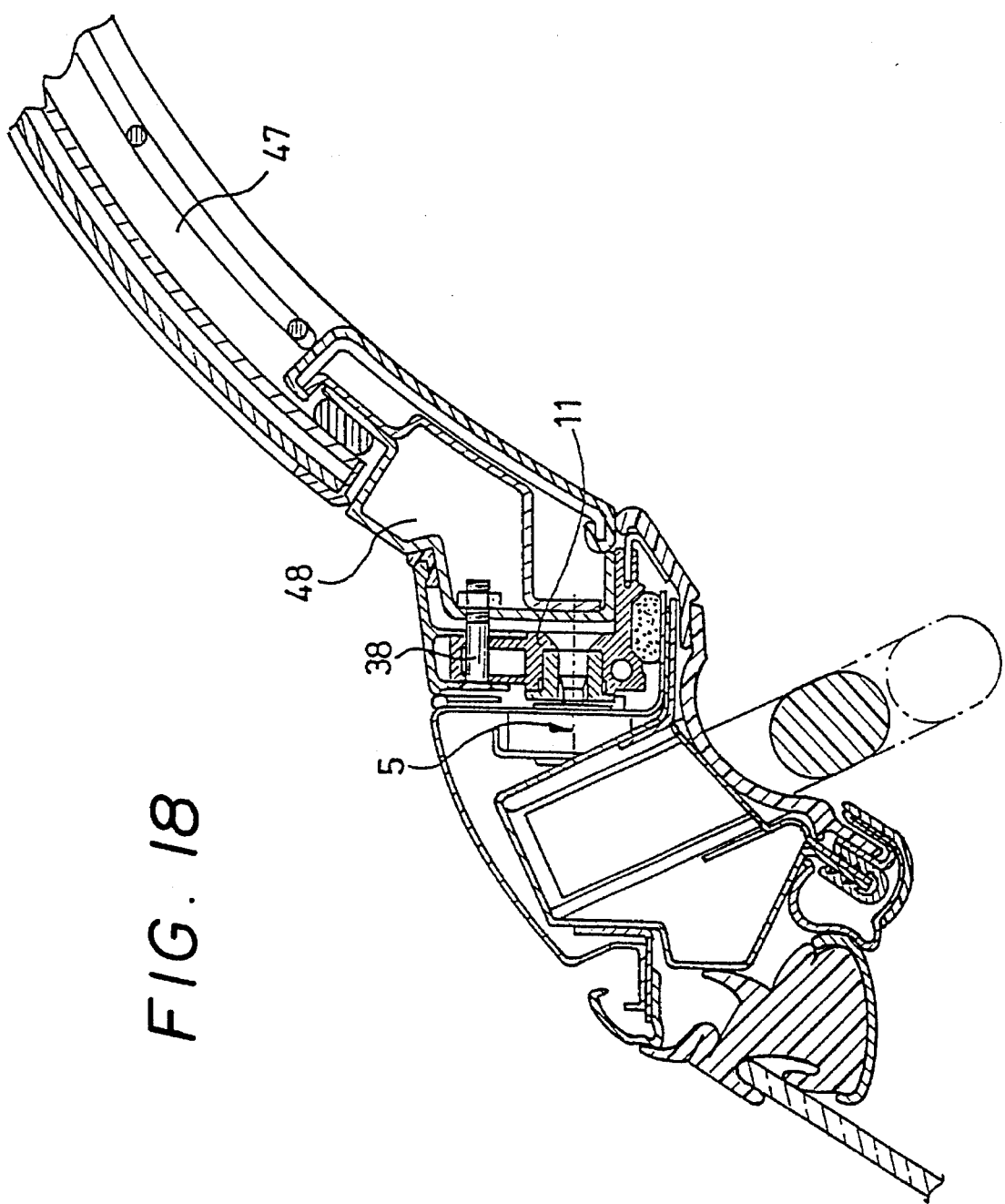
FIG. 18 shows a cross section through a rear master attachment point with a bow attachment to raise the roof height.

FIG. 18 shows the attachment to roof member 11 of a roof bow 47, which is used to increase the roof height, by means of a hollow box-shaped mount 48 attached to it using screws 38. This invention thus easily makes it possible not only to lengthen, but also increase the height of a vehicle roof by means of elevated roof parts of the modular roof insert 3.

Figure 19:
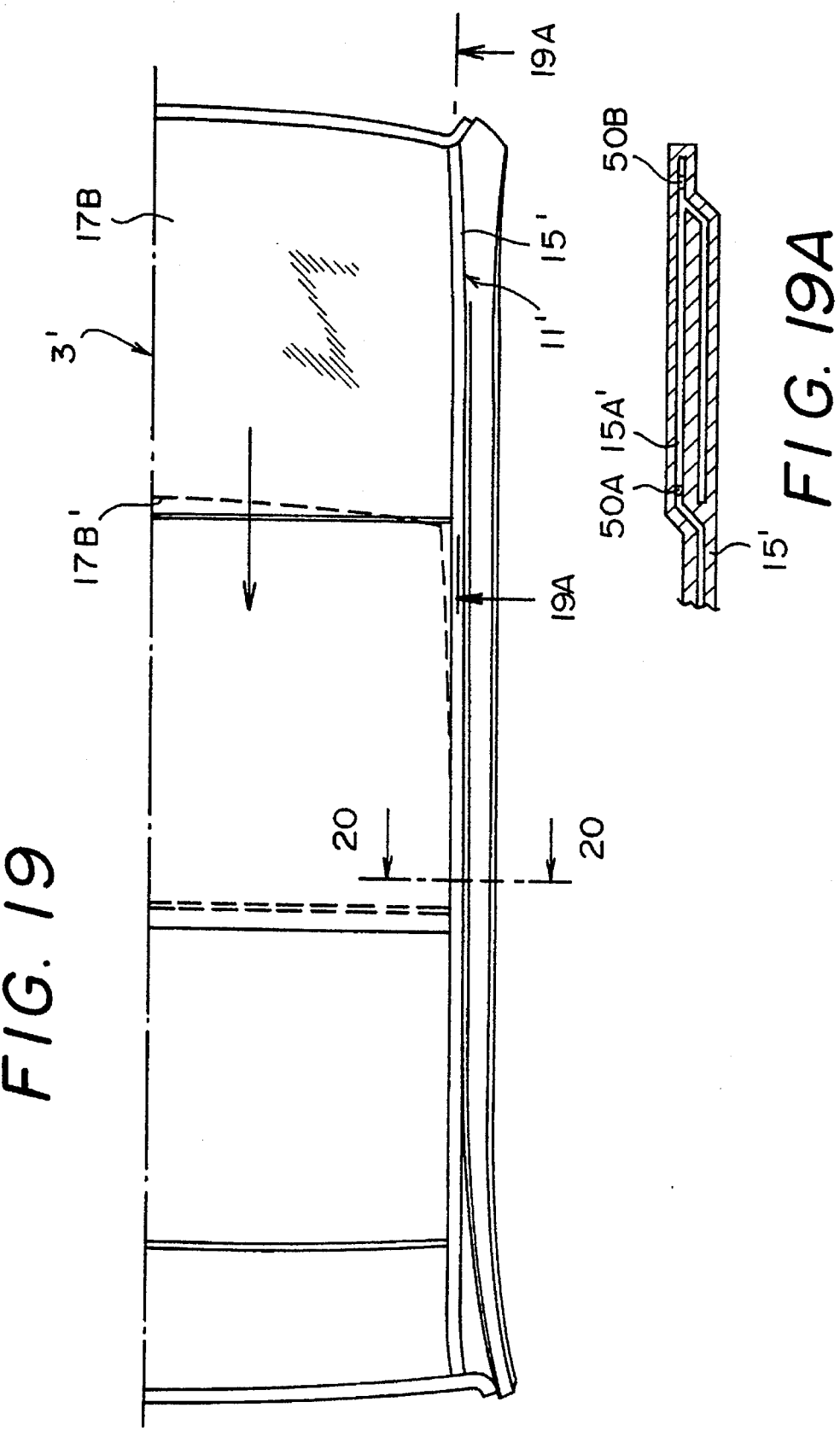
FIG. 19 shows an overhead view of a roof with nonparallel guide rails.
Figure 20:
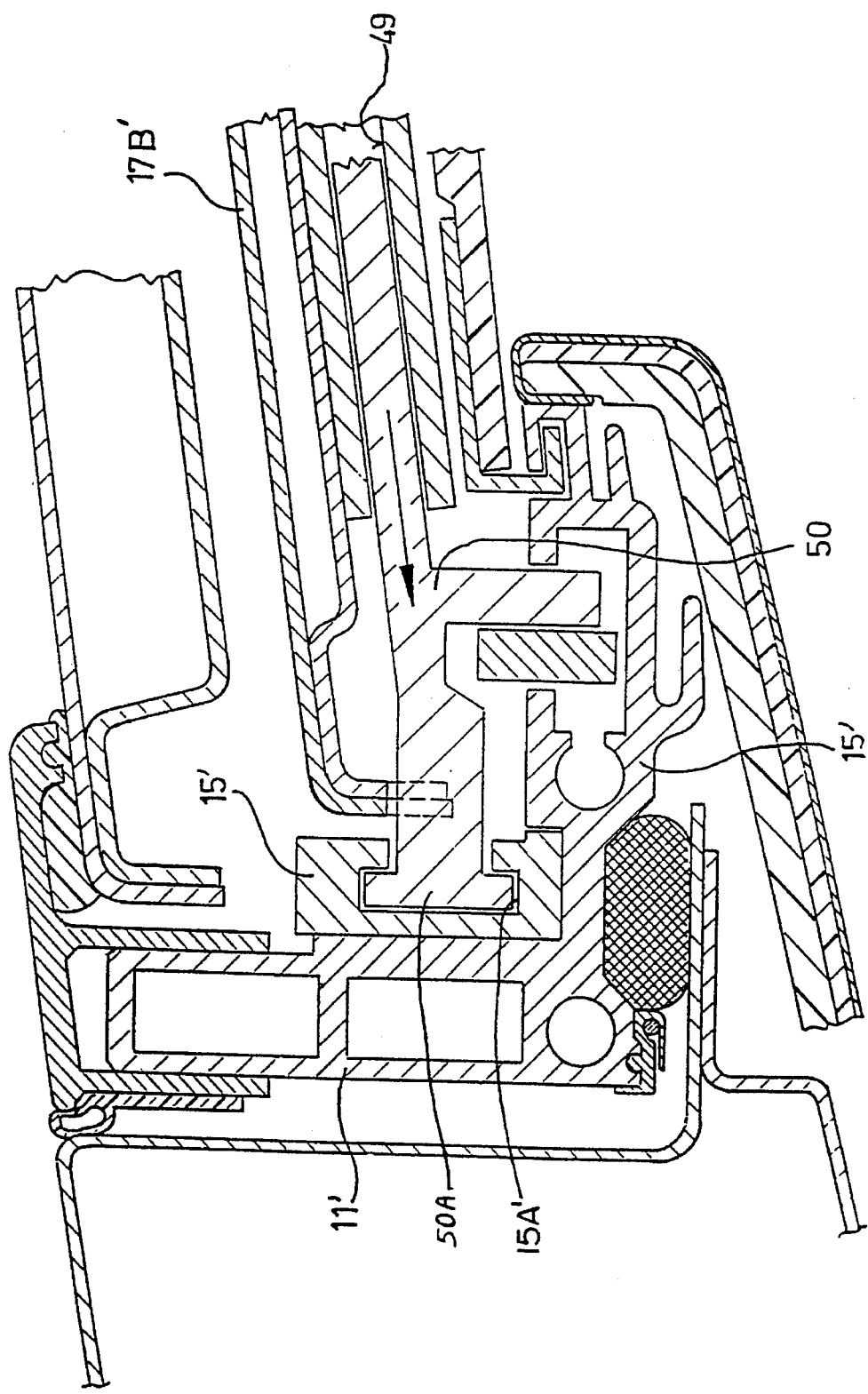
FIG. 20 shows a cross section along line 20—20 in FIG. 19.

FIGS. 19 and 20 finally show an arrangement in which lateral roof members 11', with the guide rails 15' located on them in the rear part of the vehicle, have a reduced distance relative to one another to adapt to the vehicle contour. In order that rear sliding roof cover 17B can be moved forward into its cross-hatched position labelled 17B', on its underside are slide guides 49 which run transversely to the direction of travel, and which allow the width of sliding elements 50A guided in them to be equalized, sliding elements 50A being guided to move lengthwise in guideways 15A' of guide rails 15 while the portions of sliding elements 50 within sliding guides 49 are able to move outwardly in the direction of the arrow in FIG. 20 as the width roof increases and in the opposite inward direction when it decreases.

Guideways 15A' have horizontal sections that are offset vertically with respect to one another and which are interconnected by a ramp-shaped section. To lower the sliding roof cover 17B before moving into the position labelled 17B' there are separate guideway sections and ramps (FIG. 19) for front sliding element 50A and rear sliding element 50B. In the transverse direction of the vehicle, the rear sliding element 50B is attached on cover 17B by means of slide guide 49 in the same manner indicated for sliding element 50A to enable sliding element 50B to also move laterally relative to cover 17B by moving in and out of slide guide 49 to a greater or lesser extent.

The concept of a roof structure of a motor vehicle described above satisfies, in an outstanding manner, the requirements of high flexibility with respect to the configuration of a vehicle roof with the requirement of cost-favorable logistics and installation of one such roof.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Roof structure of a vehicle comprising:
   A) a vehicle frame shell having lateral roof members which run in the longitudinal direction of the vehicle and have essentially horizontal flanges pointing inwardly toward a longitudinal centerline of the vehicle frame shell; and
   B) at least two roof parts for interchangeably closing a roof opening which lies between said lateral roof members;

wherein at least two master mounting parts are provided on each lateral roof member spaced in said longitudinal direction, said master mounting parts being dimensionally and positionally defined with respect to the frame shell; wherein each of said at least two roof parts is formed as a modular roof insert in which a respective longitudinal roof strip is premounted on each side thereof, each longitudinal roof strip having attachment parts arranged at the same spacing as the at least two master mounting parts provided on each lateral roof member; wherein attachment elements are provided by which the attachment parts of the longitudinal roof strips of the modular roof insert are securable to the master mounting parts of the lateral roof members of the frame shell; wherein said at least two roof parts comprise a first roof part having a roof cover panel which is displaceable for opening and closing an opening in a fixed roof part; wherein said attachment parts serve as a means for the attachment of at least one additional part to the fixed roof part at at least one master mounting part to which said first roof part is secured with said at least one additional part extending above the fixed roof part; wherein said roof cover panel is slidable, via slide elements on guide rails, in the longitudinal direction of the vehicle to expose said opening in fixed roof part; wherein the vehicle has a contour with a width which decreases rearwardly; wherein the roof cover panel is narrower at a rear edge; and wherein said guide rails narrow rearwardly, and said slide elements form a means for compensating for the width which decreases.

2. Roof structure according to claim 1, wherein said master mounting parts comprise screw sleeves which are mounted on said lateral roof members and which are accessible from an inner side of the frame shell, said screw sleeves running transversely to the longitudinal direction of the vehicle; and wherein said attachment elements comprise collar screws which penetrate said attachment parts of the longitudinal roof strips of the modular roof insert and are threadingly engageable in the screw sleeves from said inner side of the frame shell.

3. Roof structure according to claim 2, wherein the screw sleeves are formed of a flexible material, and are surrounded by a metal support bush.

4. Roof structure according to claim 3, wherein said flexible material is a polyamide.

5. Roof structure according to claim 3, wherein each of the lateral roof members is reinforced, at least in proximity to the master mounting parts, by at least one reinforcing sheet which is disposed parallel thereto; and wherein the screw sleeves and support bushes are held and mounted by and between the reinforcing sheet and a wall of the lateral roof member reinforced thereby.

6. Roof structure according to claim 1, wherein a continuous sealing strip of flexible material is disposed between the horizontal flange of each lateral roof member and a respective one of the longitudinal roof strips.

7. Roof structure according to claim 6, wherein the sealing strip is formed by layer of adhesive and serves as a means for securing each lateral roof member to the respective longitudinal roof strip.

8. Roof structure according to claim 1, wherein said attachment parts constitute means for engagement of the modular roof insert by tools of transport, warehousing and installation devices during transport and installation of the roof insert.

9. Roof structure according to claim 1, wherein said at least one additional part comprises at least one of a raised superstructure and a camera mounting structure.

10. Roof structure according to claim 1, wherein said at least one additional part comprises roof railings.

11. Roof structure according to claim 1, wherein said at least one additional part comprises a roof superstructure.

12. Roof structure according to claim 1, wherein each of the longitudinal roof strips is formed at least partially with a hollow cross section which has an opening at a top side thereof, said opening being located at least in proximity to said attachment parts.

13. Roof structure according to claim 12, wherein a top part of each of the longitudinal roof strips has a cover strip thereon, the cover strip having an openable cover part in the area of said opening.

14. Roof structure of a vehicle comprising:
   A) a vehicle frame shell having lateral roof members which run in the longitudinal direction of the vehicle and have essentially horizontal flanges pointing inwardly toward a longitudinal centerline of the vehicle frame shell; and
   B) at least one roof part for closing a roof opening which lies between said lateral roof members;
wherein at least two master mounting parts are provided on each lateral roof member spaced in said longitudinal direction, said master mounting parts being dimensionally and positionally defined with respect to the frame shell; wherein said at least one roof parts is formed as a modular roof insert in which a respective longitudinal roof strip is premounted on each side thereof, each longitudinal roof strip having attachment parts arranged at the same spacing as the at least two master mounting parts provided on each lateral roof member; wherein attachment elements are provided by which the attachment parts of the longitudinal roof strips of the modular roof insert are securable to the master mounting parts of the lateral roof members of the frame shell; wherein each of the longitudinal roof strips is formed at least partially with a hollow cross section which has an opening at a top side thereof, said opening being located at least in proximity to said attachment parts; wherein a top part of each of the longitudinal roof strips has a cover strip thereon, the cover strip having an openable cover part in the area of said opening and wherein the cover strip and the at least one roof part are attached to the longitudinal roof strip by the same attachment means.

15. Roof structure according to claim 1, wherein said roof cover panel is slidable in the longitudinal direction of the vehicle to expose a sliding roof opening; and wherein said at least one additional part comprises a roof superstructure which increases the height of the vehicle roof.

16. Roof structure according to claim 15, wherein guide rails for the slidable roof cover panel and mounts for attaching a fixed vehicle inside liner are molded onto the longitudinal roof strips.

17. Roof structure according to claim 15, wherein the longitudinal roof strips are matched to a curved roof contour of the vehicle.

18. Roof structure according to claim 1, wherein one of said at least two roof parts comprises a roof cover panel which is slidable, via slide elements on guide rails, in the longitudinal direction of the vehicle to expose a sliding roof opening; wherein the vehicle has a contour with a width which decreases rearwardly; wherein the roof cover panel is narrower at a rear edge; and wherein said guide rails narrow rearwardly, and said slide elements form a means for compensating for the width which decreases.

19. Roof structure according to claim 1, wherein the roof parts comprise a plurality of different modular roof inserts; wherein the modular roof insert of each of the roof parts is provided with a respective longitudinal roof strip that is premounted on each side of the roof part, each longitudinal roof strip having said attachment parts arranged at the same spacing as the at least two master mounting parts provided on each lateral roof member; and wherein each of said modular roof inserts are selectively and interchangeably securable to the master mounting parts of the lateral roof members of the frame shell by the attachment elements at the attachment parts of the longitudinal roof strips of the modular roof insert.

20. Roof structure according to claim 19, wherein said plurality of modular roof inserts differ by the provision of at least one of roof railings, dimensions, a raised superstructure, at least one slidable cover panel, and camera mounting structure.

* * * * *